(12) United States Patent
Gronlund et al.

(10) Patent No.: US 6,959,658 B2
(45) Date of Patent: Nov. 1, 2005

(54) BREAKAWAY LACING FOR EMERGENCY EVACUATION SLIDE

(75) Inventors: Alan W. Gronlund, Phoenix, AZ (US); Clarence S. Melander, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 216 days.

(21) Appl. No.: 10/671,127

(22) Filed: Sep. 24, 2003

(65) Prior Publication Data

US 2004/0094361 A1 May 20, 2004

Related U.S. Application Data

(60) Provisional application No. 60/418,838, filed on Oct. 15, 2002.

(51) Int. Cl.[7] .............................. D05B 1/06; B64D 1/12
(52) U.S. Cl. ............................ 112/475.01; 112/475.08; 244/132.2; 244/905
(58) Field of Search ...................... 112/475.01, 475.08, 112/475.17, 197, 406; 244/129.5, 118.3, 244/137.3, 142, 146, 905, 137.2; 441/40, 441/41, 42; 182/48

(56) References Cited

U.S. PATENT DOCUMENTS

| 2,017,679 | A | | 10/1935 | Allis |
| 2,959,278 | A | | 11/1960 | Mitchell et al. |
| 3,463,266 | A | | 8/1969 | Day et al. |
| 3,808,994 | A | * | 5/1974 | Kuhn ......................... 112/199 |
| 4,104,964 | A | * | 8/1978 | Larkworthy et al. ........ 100/232 |
| 4,441,582 | A | | 4/1984 | Ward, Jr. |
| 4,519,782 | A | * | 5/1985 | Fisher ......................... 441/40 |
| 5,360,186 | A | | 11/1994 | Danielson et al. |
| 5,618,011 | A | | 4/1997 | Sadeck et al. |
| 5,906,340 | A | | 5/1999 | Duggal |
| 6,814,183 | B2 | * | 11/2004 | Horvath et al. ............... 182/48 |

* cited by examiner

Primary Examiner—Ismael Izaguirre
(74) Attorney, Agent, or Firm—Jerry J. Holden; John D. Titus

(57) ABSTRACT

A method of lacing together two parts of an inflatable evacuation slide uses a single piece of cord that is passed through multiple pairs of apertures formed in the two parts to be joined. Thereafter, the loops formed by passing the cord through the multiple apertures are laced together and secured with a conventional key loop. In operation, once the key loop is released, since the lacing is composed of a single length of cord, rather than multiple independent loops, the tension in all of the lacing is released simultaneously thereby allowing the lacing to unravel reliably irrespective of the load on the lacing.

14 Claims, 6 Drawing Sheets

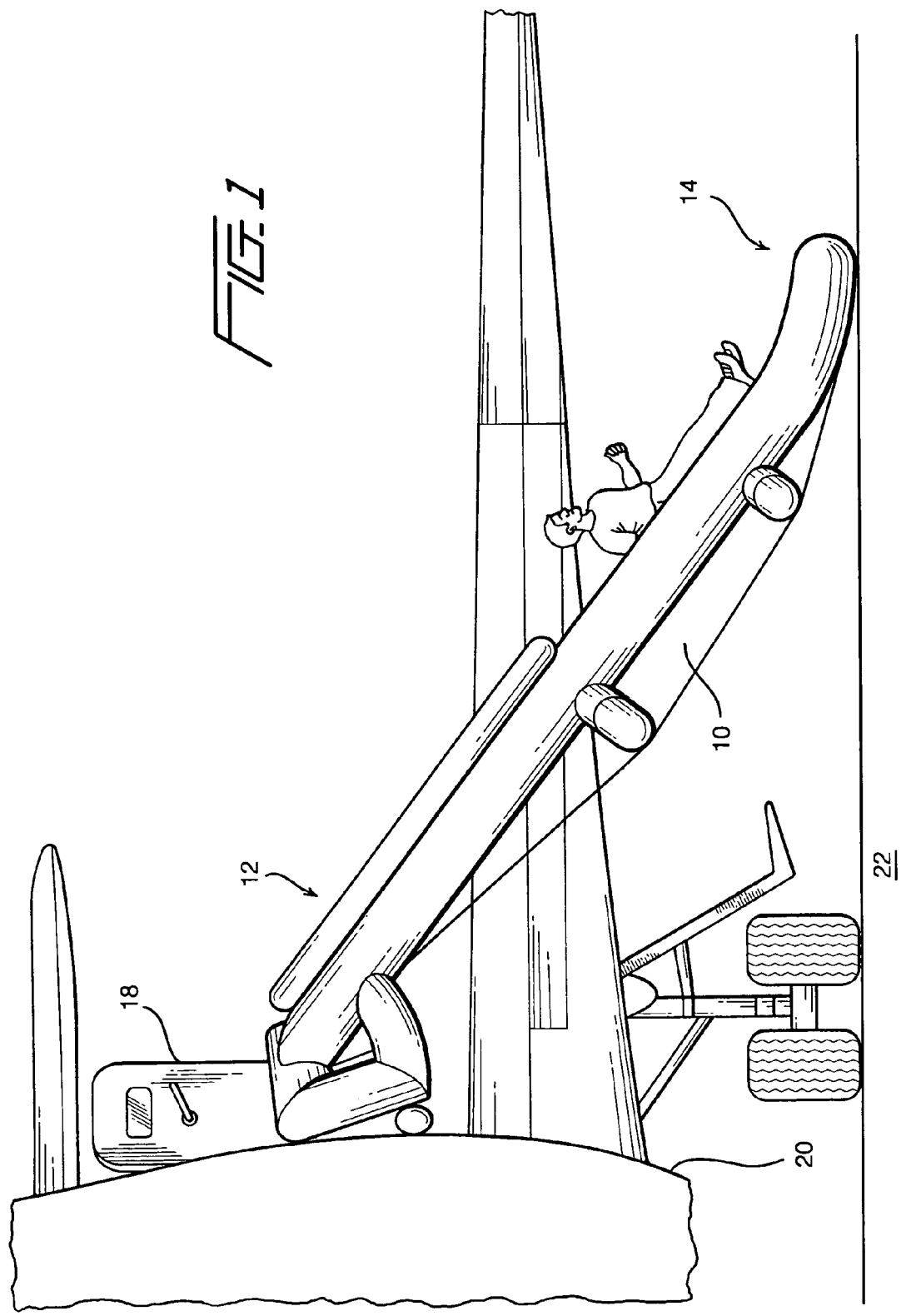

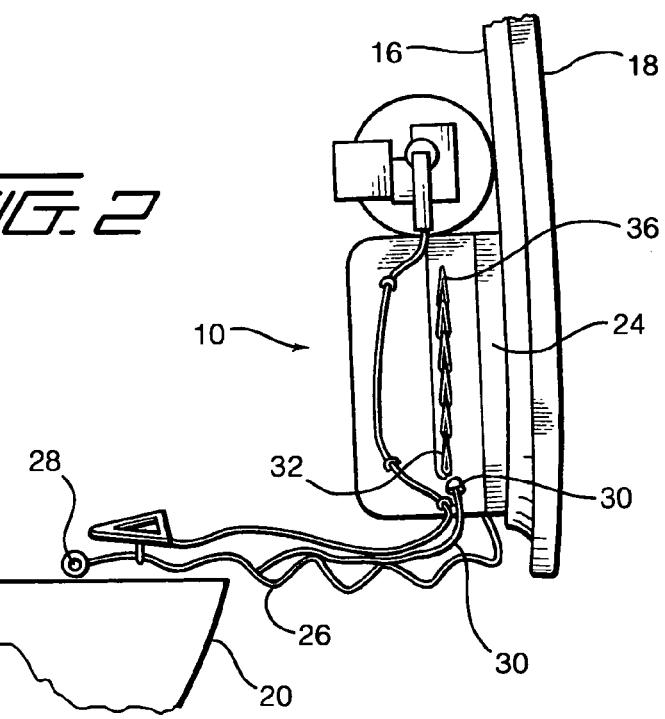
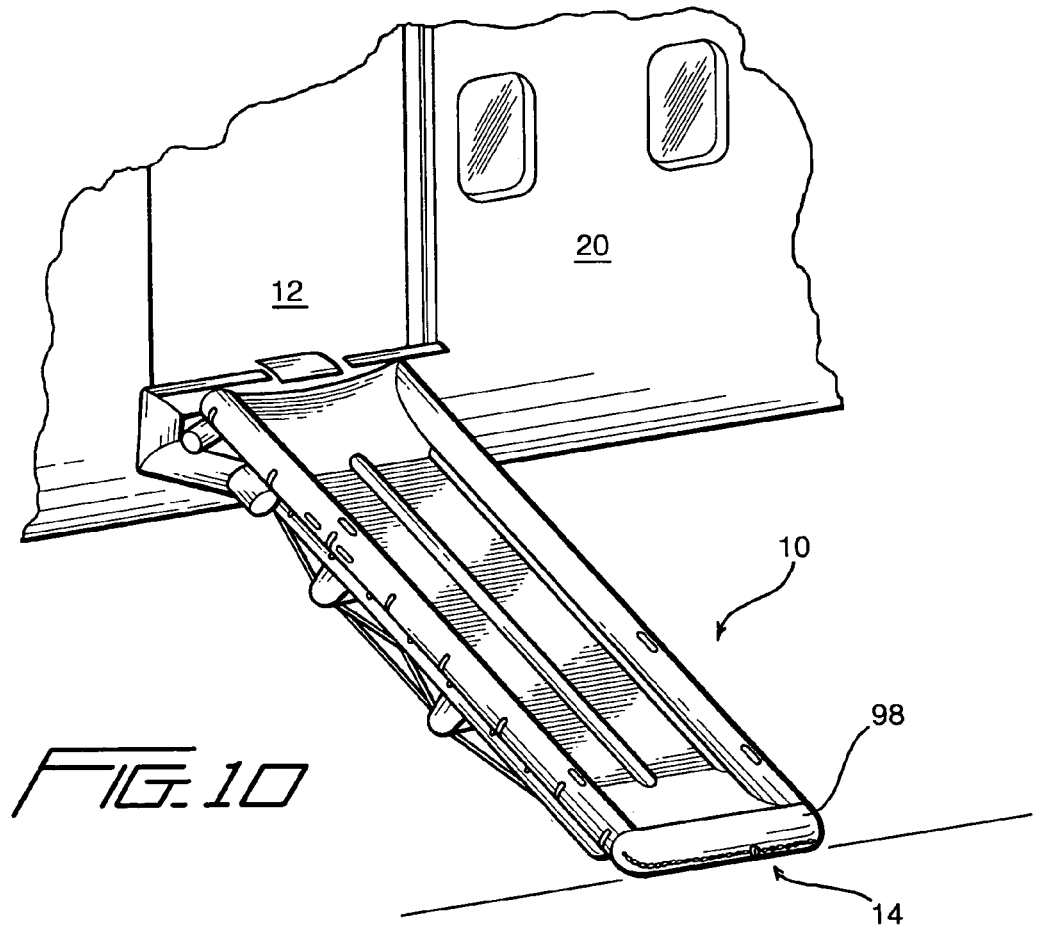

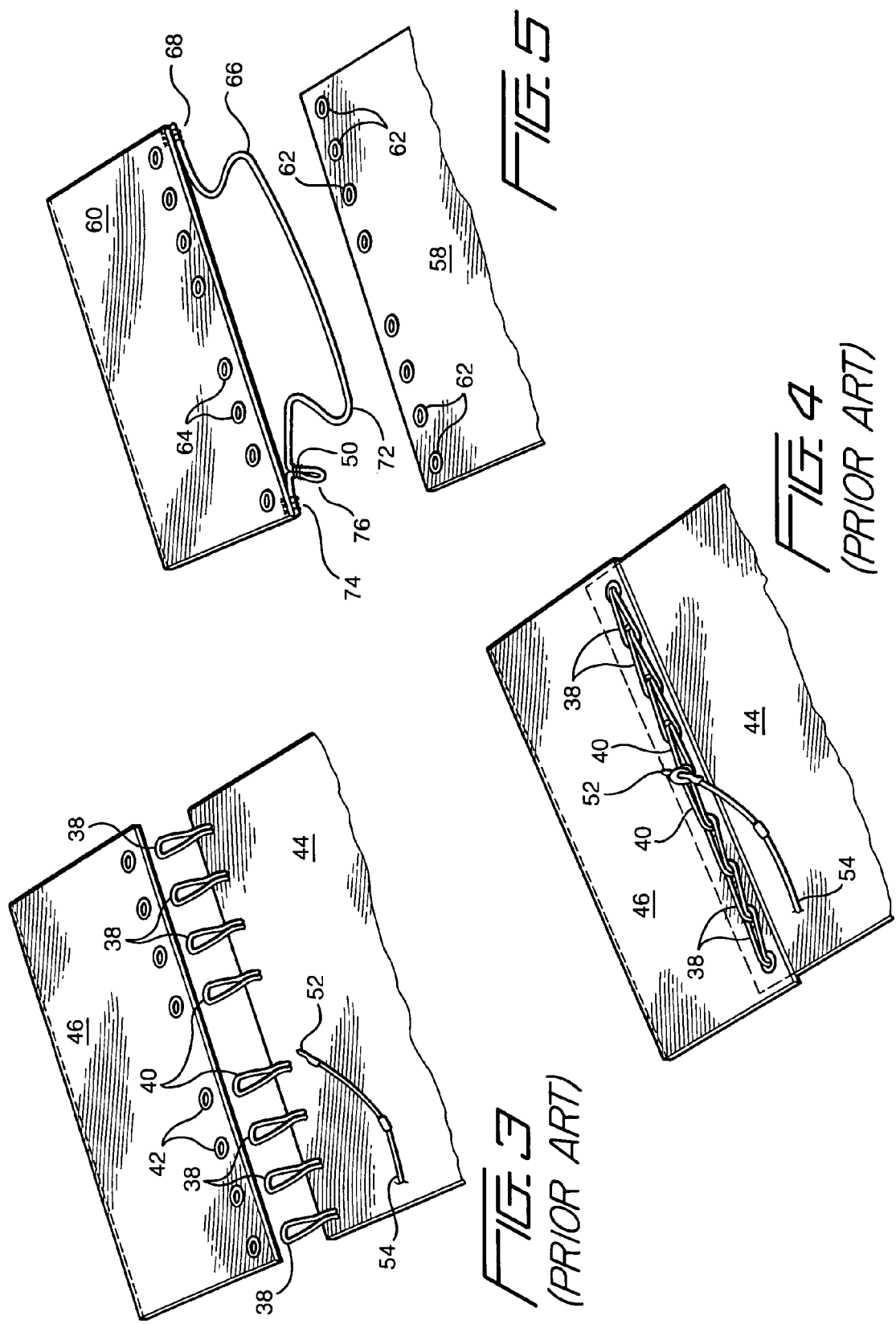

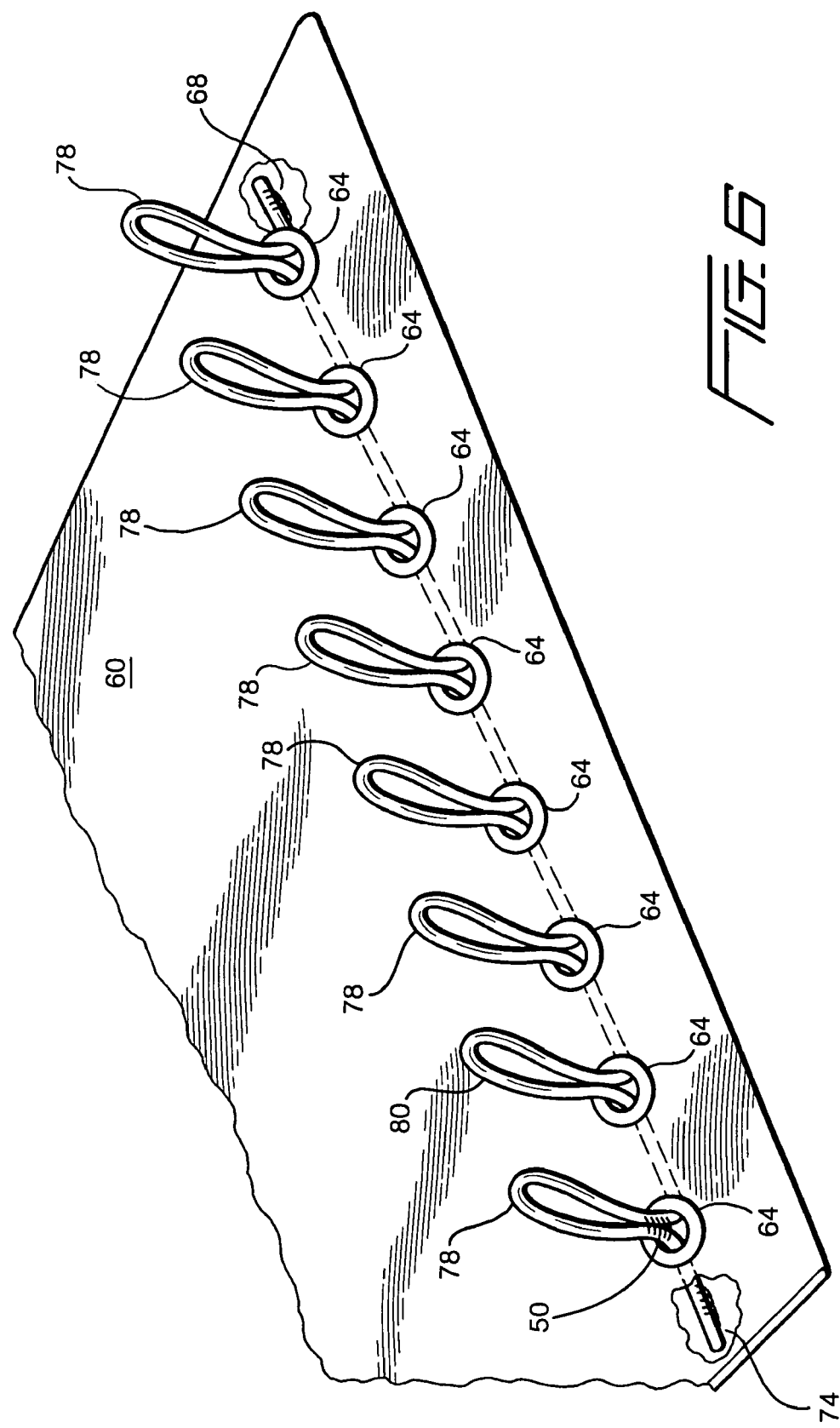

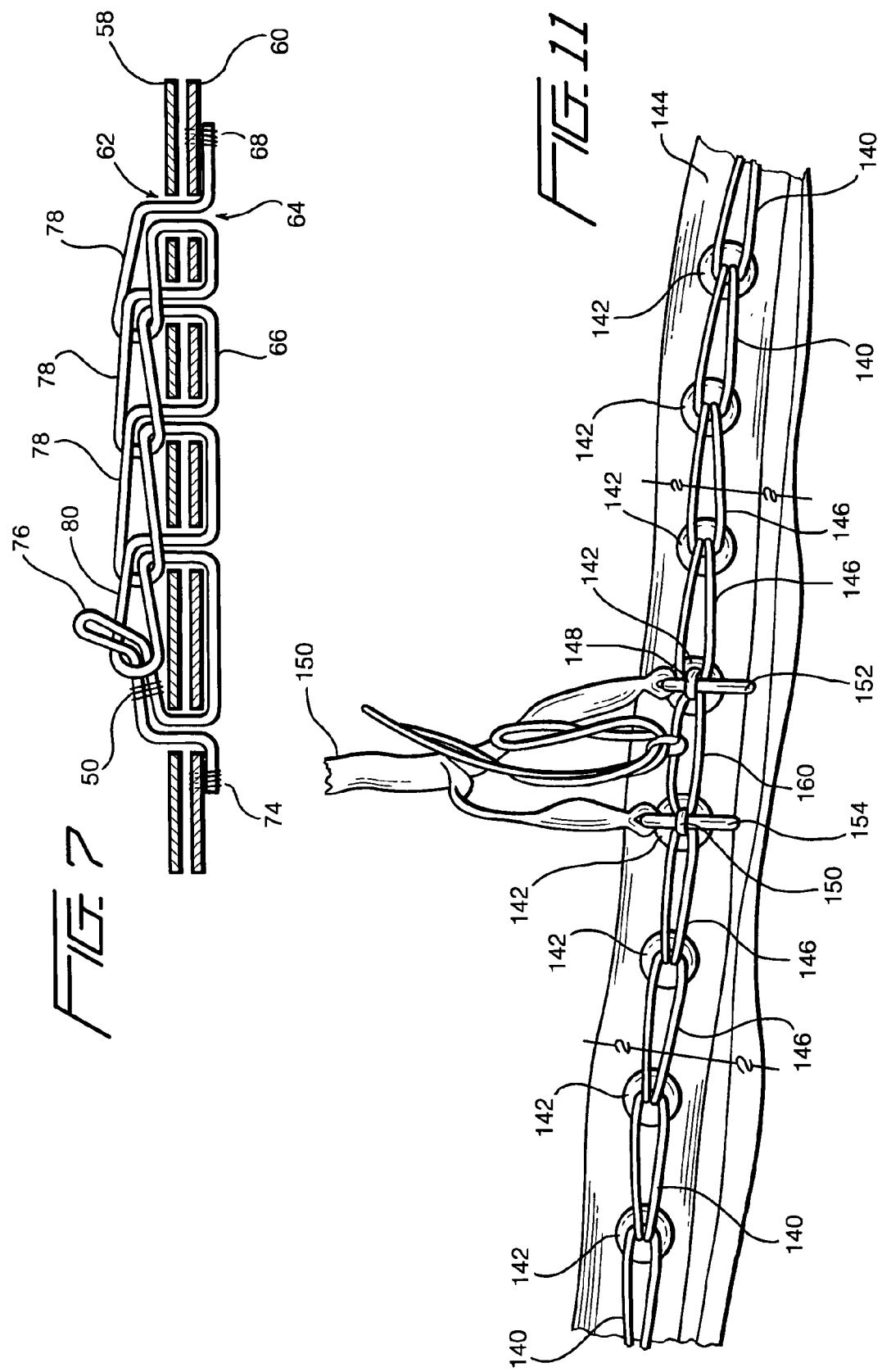

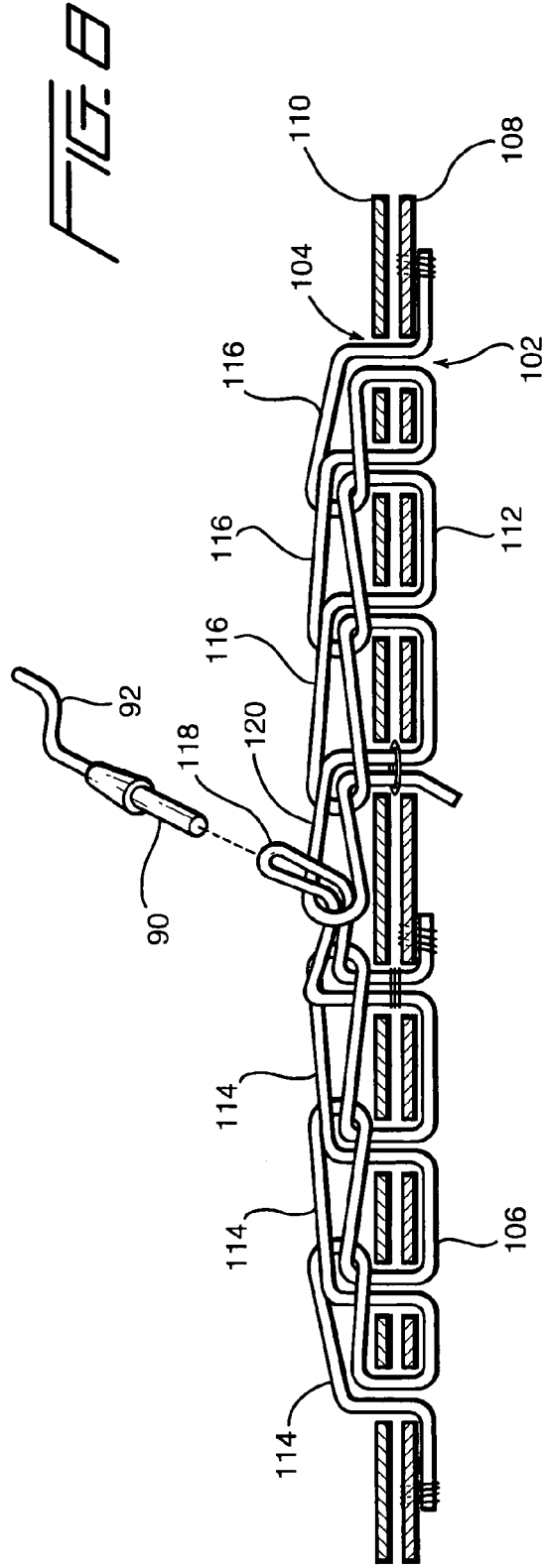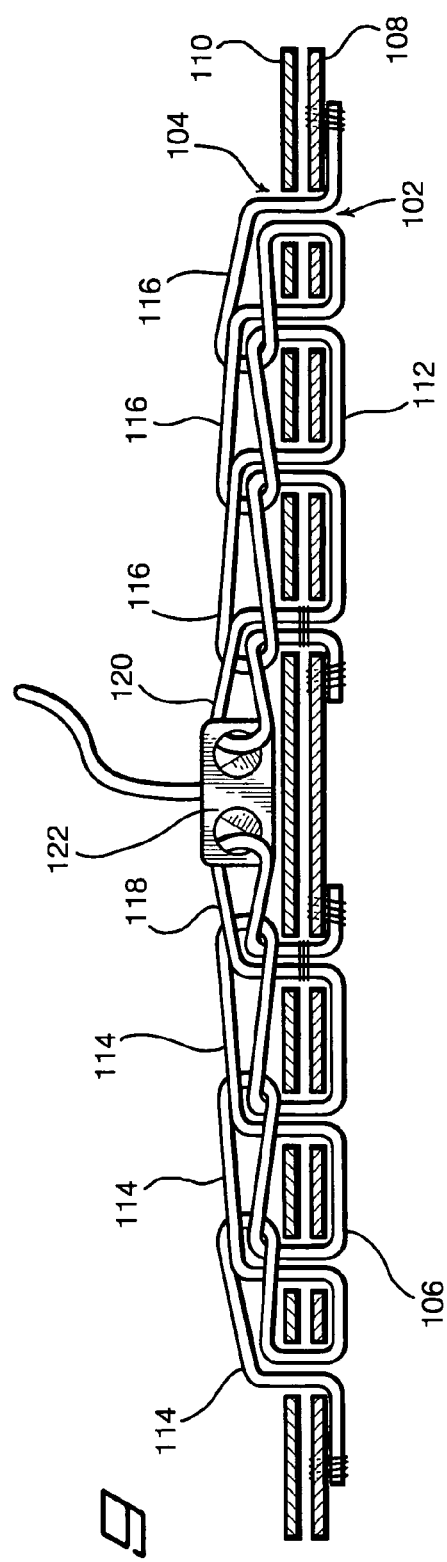

BREAKAWAY LACING FOR EMERGENCY EVACUATION SLIDE

This application claims priority of U.S. Provisional Application Ser. No. 60/418,838, filed Oct. 15, 2002.

BACKGROUND OF THE INVENTION

This invention relates to emergency evacuation equipment for aircraft, in particular, to inflatable aircraft emergency evacuation slides.

The conventional method of quickly evacuating a large number of passengers from an aircraft in an emergency is to provide multiple emergency exits, each of which is equipped with an inflatable evacuation slide. These inflatable evacuation slides are normally stored in an uninflated condition in a container, or slide pack, requiring a minimum of space in the interior of the aircraft. The slide pack is typically attached to a packboard mounted on or adjacent to the interior of the aircraft exit door. In a conventional aircraft evacuation slide system, the operation of which is described among other places in U.S. Pat. No. 4,441,582 to Ward, if the aircraft exit door is opened in the "armed" condition, the entire slide pack to falls to the sill of the aircraft. As the door is moved further away from the doorway the slide pack falls out of the doorway toward the ground. As the slide pack falls toward the ground, a lanyard is tensioned to withdraw a pin from the key loop of a series of interlaced loops commonly referred to as "daisy chain" lacing. Withdrawal of the pin from the key loop of the daisy chain lacing causes the lacing to unravel releasing the slide from the slide pack for inflation.

Prior art methods of storing a fold uninflated evacuation slide within a pack closed by conventional daisy chains lacing have proved adequate for small to moderate sized inflation slides. Conventional daisy chain lacing, however, does not reliably release under the strain of large, tight slide packs or slides that have been stored for a protracted period of time. Accordingly, what is needed is a method of lacing an aircraft evacuation slide that reliably releases under all conditions.

SUMMARY OF THE INVENTION

The present invention is directed to a method of lacing together two parts of an inflatable evacuation slide in which a single piece of cord is passed through multiple pairs of apertures or grommets formed in the two parts to be joined. Thereafter, the loops formed by passing the cord through the multiple grommets are laced together and secured with a conventional key loop. In operation, once the key loop is released, since the lacing is composed of a single length of cord, rather than multiple independent loops, the tension in all of the lacing is released simultaneously thereby allowing the lacing to unravel reliably irrespective of the tension on the lacing or the duration of its storage prior to being released.

BRIEF DESCRIPTION OF THE DRAWING

The present invention will be better understood from a reading of the following detailed description, taken in conjunction with the accompanying drawing figures in which like references designate like elements and, in which:

FIG. 1 is a side view of an evacuation slide incorporating features of the present invention;

FIG. 2 is a side view of an evacuation slide pack, portions of which are joined together by lacing incorporating features of the present invention;

FIG. 3 is a partial perspective view of two portions of an evacuation slide joined by prior art daisy chain lacing;

FIG. 4 is a partial perspective view of two portions of an evacuation slide joined by prior art lacing;

FIG. 5 is a partial perspective view of two portions of an aircraft evacuation slide joined together by lacing incorporating features of the present invention;

FIG. 6 is an enlarged perspective-view of a portion of the lacing shown in FIG. 5;

FIG. 7 is a cross-sectional illustration of two parts of an aircraft evacuation slide joined together by lacing incorporating features of the present invention;

FIG. 8 is a cross-section of two portions of an aircraft evacuation slide joined by an alternative embodiment of lacing incorporating features of the present invention;

FIG. 9 is a cross-section of two portions of an aircraft evacuation slide joined by an alternative embodiment of lacing incorporating features of the present invention;

FIG. 10 is a perspective view of an aircraft evacuation slide including a toe end compartment joined together by lacing incorporating features of the present invention; and FIG. 11 is a partial perspective view of an alternative hybrid lacing incorporating features of the present invention.

DETAILED DESCRIPTION

The drawing figures are intended to illustrate the general manner of construction and are not necessarily to scale. In the detailed description and in the drawing figures, specific illustrative examples are shown and herein described in detailed. It should be understood, however, that the drawing figures and the detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1 and 2, an inflatable evacuation slide assembly 10 generally comprises a head end 12 and a foot end 14. Head end 12 is configured to couple evacuation slide assembly 10 to an exit door 18 of an aircraft 20, while foot end 14 is in contact with the ground 22 such that the slide assembly 10 provides a sloping surface to permit the rapid egress from passengers from aircraft 20. The entire inflatable evacuation slide assembly 10 is preferably fabricated from an air impervious material such as a lightweight fabric that has been coated with an elastomer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all the chambers comprising the structure are interconnected pneumatically, such that a single pressurized gas source, such as compressed carbon-dioxide, nitrogen, or argon, output from a pyrotechnic gas generator, or a hybrid pyrotechnic/compressed gas generator may be utilized for its deployment.

As shown in FIG. 2, evacuation slide assembly 10 is typically stored in a folded, uninflated condition within a slide pack 24 mounted to the interior surface 16 of aircraft door 18. As the aircraft door is opened in the armed condition, the girt portion 26 of evacuation slide assembly 10, which is secured to the aircraft door sill by girt bar 28, pulls slide pack 24 off its mountings on interior surface 16 of door 18. This allows slide pack 24 to begin to fall. After slide pack 24 has fallen a predetermined distance, a lanyard 30 attached to girt 26 withdraws a pin 32 from a key loop 34 which allows the lacing 36 to unravel thereby releasing the evacuation slide assembly 10 from the enclosure of slide pack 24.

With reference to FIGS. 3 and 4, a prior art "daisy chain" lacing for joining two parts of an inflatable aircraft evacuation slide comprises a plurality of fixed loops 38 and key loops 40 fastened to one end of a panel 44. A like number of apertures 42 are formed in the opposite end of a panel 46 to be joined to panel 44. The ends of panels 44 and 46 are lined up so that each of apertures 42 are positioned over one of loops 38 and 40. Each of the loops 38, 40 are passed through apertures 42 in panel 46. Beginning with the loop furthest from key loop 40 at each end, each loop is threaded through the adjacent outboard loop working inwardly toward key loops 40. Key loops 40 are then held together by threading one through the other and then passing a pin 52 attached to a lanyard 54 through the resulting loop. Although there are numerous ways of securing the key loop of such a laced assembly, the basic principal of a plurality of individual loops threaded one through another is consistent throughout all prior art evacuation slide daisy chain style lacing.

FIG. 5 is a perspective view of two parts of an inflatable aircraft evacuation slide joined together by means of lacing incorporating features of the present invention. As shown in FIG. 5, a first panel 58 has formed therein a plurality of apertures 62, which in a preferred embodiment are provided with suitable grommets for reinforcement. A second panel 60 has a plurality of corresponding apertures 64 formed therein. (As used herein "corresponding apertures" means that the apertures in second panel 60 will line up with apertures 62 in first panel 58 to facilitate lacing the assembly together.) A length of cord 66 is fastened by suitable means (e.g., stitching) at one end 68 to second panel 60 and at a second end 74 to second panel 60. A key loop 76 is formed by fastening a portion of cord 66 together with stitching 50 proximal second end 74. Cord 66 may be any suitable length of cord made from natural or synthetic fibers, however, in the illustrative embodiment cord 66 is MIL-C-7515 nylon cord.

With reference to FIG. 6, portions of cord 66 are threaded through apertures 64 of panel 60 to form a series of substantially equal size loops 78 (hereinafter referred to alternatively as "loops" or "breakaway loops") and a substantially equally sized terminal loop 80. Key loop 76 is also passed through one of apertures 64.

As shown in FIG. 7, each of loops 78 is threaded through apertures 62 of panel 58 and thereafter threaded through an adjacent loop 78 to form a chain of interlocked loops terminating in a terminal loop 80 through which is threaded key loop 76. Alternatively, in lieu of anchoring terminal loop 80 to key loop 76, terminal loop 80 could be anchored directly to panel 58 or 60 (e.g., by passing terminal loop 80 through a grommet and securing with a pin, passing terminal loop 80 through a cord cutter anchored to panel 58 or other conventional means) all within the scope of the present invention. Also, in lieu of using stitching 50, key loop 76 may be formed by tying a knot in cord 66 proximal end 74.

With reference to FIGS. 8, 9 and 10, according to another embodiment of the present invention, a bi-directional lacing in accordance with the present invention is used to close a compartment 98 at the foot end 14 of an evacuation slide assembly 10. In the embodiment of FIGS. 8 and 9, cord 106 and cord 112 are threaded through a plurality of apertures 102 and 104 in panels 108 and 110 to form a series of loops 114 and 116 as well as key loops 118 and 120 (which, as noted hereinbefore, may be stitched or knotted). Key loops 118 and 120 are threaded through each other and secured with a pin 90 attached to a lanyard 92. Alternatively, as shown in FIG. 9, ping 90 is replaced with a pyrotechnic cord cutter 122. In operation, under the appropriate conditions, as the evacuation slide assembly 10 is deployed, a signal is sent to pyrotechnic cord cutter 122 which severs both of key loops 118 and 120. Because cord 106 and cord 112 form all of the breakaway loops that form the breakaway lacing, once the key loops 118 and 120 are released the tension in the lacing is relieved simultaneously and uniformly rather than seriatim as in the prior art daisy uniformly and the lacing unravels immediately and more reliably than has been heretofore possible.

With reference to FIG. 11, yet another alternative embodiment of a hybrid lacing comprising a combination of daisy chain loops and breakaway loops is shown. In the embodiment of FIG. 11, a plurality of conventional daisy chain loops 140 are threaded through corresponding apertures 142 in a panel 144 beginning at the outermost ends and working inward toward the center. The innermost of daisy chain loops 140 are then laced to the outermost of a plurality of breakaway loops 146, which thereafter are threaded together as hereinbefore described. The innermost of breakaway loops 146 are secured to key loops 148 and 150. Key loops 148 and 150 are then secured by pins 152 and 154 connected to a common lanyard 156. A master loop 160 redundantly secures key loops 148 and 150 together. The purpose of master loop 160 is to prevent accidental unraveling of the lacing in the event pins 152 and 154 are inadvertently withdrawn. In normal operation, master loop 160 is severed by means of a pyrotechnic cord cutter THAT "arms" the lacing such that withdrawal of pins 152 and 154 will cause the lacing to unravel. Once the slide is in position for deployment pins 152 and 154 are withdrawn by means of common lanyard 156 which causes the breakaway lacing to unravel.

Although certain illustrative embodiments and methods have been disclosed herein, it will be apparent from the foregoing disclosure to those skilled in the art that variations and modifications of such embodiments and methods may be made without departing from the spirit and scope of the invention. For example, a myriad of methods for securing the key loop of the breakaway lacing in accordance with the present invention are possible. Accordingly, it is intended that the invention shall be limited only to the extent require by the appended claims and the rules and principles of applicable law.

What is claimed is:

1. A method of lacing together portions of an inflatable evacuation slide system comprising:

providing a first panel composed of a first flexible material, said first panel having a first edge and a first plurality of apertures;

providing a second panel composed of a second material, said second panel having a second edge and a second plurality of apertures corresponding to said first plurality of apertures;

providing a length of cord having a first end and a second end;

attaching said cord to one of said first panel and said second panel;

passing a portion of said cord through each of said first plurality of apertures to form a plurality of loops including a first loop proximal said first end, a second loop adjacent said first loop, and a remainder of said plurality of loops including a last loop proximal said second end of said cord;

passing each of said plurality of loops through corresponding apertures of said second plurality of apertures;

thereafter threading each of said plurality of loops through an immediately preceding adjacent loop beginning with threading said second loop through said first loop and continuing with said remainder of said plurality of loops until said last loop is reached;

and securing said last loop to one of said first and second panels.

2. The method of claim 1, wherein:
said last loop comprises a key loop formed by tying a knot in said cord proximal said second end.

3. The method of claim 1, wherein:
said last loop comprises a key loop formed by attaching said cord to one of said first panel and said second panel proximal said second end of said cord.

4. The method of claim 1, wherein:
said first plurality of apertures is disposed along said first edge of said first panel and said second plurality of apertures is disposed along said second edge of said second panel.

5. The method of claim 2, further comprising:
attaching a remotely actuated cord cutter to said key loop.

6. The method of claim 2, further comprising:
inserting a removable pin through said key loop to retain said key loop in a fixed position.

7. The method of claim 3, further comprising:
attaching a remotely actuated cord cutter to said key loop.

8. The method of claim 3, further comprising:
inserting a removable pin through said key loop to retain said key loop in a fixed position.

9. The method of claim 1, further comprising:
attaching grommets to said first panel and said second panel to reinforce said first plurality of apertures and said second plurality of apertures.

10. The method of claim 1, wherein:
said first panel and said second panel comprise portions of an enclosure for storing an un-inflated, stored evacuation slide within an aircraft.

11. The method of claim 1, wherein:
said first panel and said second panel comprise portions of a compartment for storing an un-inflated extensible toe portion of an inflatable evacuation slide.

12. Apparatus for joining together two parts of an inflatable aircraft evacuation slide comprising:

a single strand of cord having a first end attached to one of said two parts to be joined;

two opposed rows of apertures formed one each in said two parts to be joined, each of said two opposed rows of apertures arranged respectively along an edge of each of said two parts to be joined, each of said apertures in one of said two opposed rows of apertures disposed to correspond with an aperture in the other of said two opposed rows of apertures to form a plurality of pairs of apertures;

a chain of interlocked loops formed by a portion of said single strand of cord being threaded through each of said plurality of pairs of apertures to form a plurality of loops each of which is thereafter threaded through an adjacent loop, said chain of interlocked loops terminating in a single key loop; and a releasable member securing said key loop to one of said two parts to be joined.

13. The apparatus of claim 10, wherein:
said releasable member comprises a pin threaded through said key loop, whereby said key loop is released by withdrawing said pin from said key loop.

14. The apparatus of claim 10, wherein:
said releasable member comprises a cord cutter attached to said key loop, whereby said key loop is released by said cord cutter cutting said key loop.

* * * * *